(12) United States Patent
Wang (10) Patent No.: US 7,385,998 B2
(45) Date of Patent: Jun. 10, 2008

(54) METHOD AND APPARATUS FOR ENCAPSULATING SERVICES FOR TRANSPORTATION OVER METALLIC PHYSICAL MEDIUMS

(75) Inventor: Guo-Qiang Wang, Kanata (CA)

(73) Assignee: Nortel Networks Limited (CA)

( * ) Notice: Subject to any disclaimer, the term of this patent is extended or adjusted under 35 U.S.C. 154(b) by 852 days.

(21) Appl. No.: 10/657,654

(22) Filed: Sep. 8, 2003

(65) Prior Publication Data

US 2005/0053064 A1 Mar. 10, 2005

(51) Int. Cl.
*H04L 12/56* (2006.01)

(52) U.S. Cl. ........................ 370/420; 370/540

(58) Field of Classification Search ........... 370/389, 370/358, 391, 411, 419, 463, 471, 490, 532, 370/469, 465, 466, 473, 474, 487, 497, 395.5, 370/420, 359, 534, 537, 540
See application file for complete search history.

(56) References Cited

U.S. PATENT DOCUMENTS

| 7,164,860 B1* | 1/2007 | Narvaez et al. ............... 398/58 |
| 2002/0083190 A1* | 6/2002 | Kamiya et al. ............. 709/236 |
| 2002/0090007 A1* | 7/2002 | Kamiya et al. ............. 370/476 |
| 2004/0105459 A1* | 6/2004 | Mannam ...................... 370/465 |

OTHER PUBLICATIONS

E. Hernandez-Valencia, *Generic Framing Procedure (GFP) for NG-SONET/SDH: An Overview*, Jul. 2002.

S. Gorshe, *Transparent Generic Framing Procedure (GFP) Technology White Paper*, May 2002.

G. Young, *SONET/SDH and OTN Generic Framing Procedure (GFP) Adaptation/Encapsulation of 802.17 MAC Clients*, May 2001.

J. Carlson, et al., *PPP over Simple Data Link (SDL) using SONET/SDH with ATM-like framing*, Internet Engineering Task Force (IETF) Request For Comments (RFC) 2823, May 2000.

E-mail between G.Q. Wang and Steve Gorshe dated Sep. 18, 2002.

S. Gorshe, *Contribution to TI Standards Project—T1X1.5*, Jun. 2003.

\* cited by examiner

*Primary Examiner*—Brenda Pham
(74) *Attorney, Agent, or Firm*—Anderson Gorecki & Manaras LLP (57) ABSTRACT

A network element employing a universal mapper enables multiple services to be mapped onto a physical medium (metallic link with a particular physical layer protocol) so that the number of service mappers, and hence the complexity of the network element, may be reduced, the cost of provisioning the device may be reduced, and new services may be deployed, such as Ethernet over T1. The universal mapper may be configured to generate frames for transmission over multiple physical mediums utilizing a protocol known as Generic Framing Procedure (GFP). Using this embodiment, services such as ATM, Frame Relay, Ethernet, IP/PPP, Voice, and Infiniband may be transported in GFP frames over metallic links operating using xDSL, T1/E1, T3/E3, or cable access technologies by utilizing a single GFP framer and a single set of service mappers.

13 Claims, 4 Drawing Sheets

METHOD AND APPARATUS FOR ENCAPSULATING SERVICES FOR TRANSPORTATION OVER METALLIC PHYSICAL MEDIUMS

BACKGROUND OF THE INVENTION

1. Field of the Invention

The present invention relates to communication networks and, more particularly, to a method and apparatus for encapsulating services for transportation over metallic physical mediums.

2. Description of the Related Art

Data communication networks may include various routers, switches, nodes, hubs, proxies, and other network devices coupled to and configured to pass data to one another. These devices will be referred to herein as "network elements." Data is communicated through the data communication network by passing data packets, cells, frames, or segments (collectively referred to herein as Protocol Data Units (PDUs)) over communication links extending between the network elements. A particular PDU may be handled by multiple network elements and cross multiple communication links as it travels between its source and its destination over the network.

Figure 1:
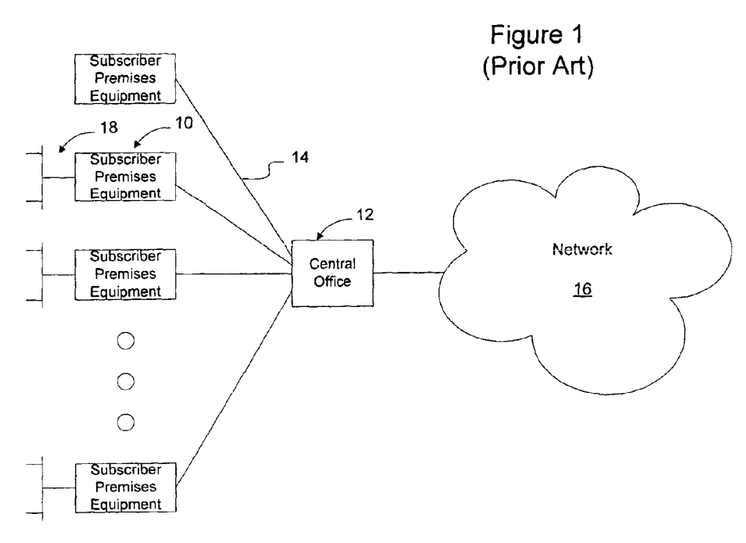
FIG. 1 is a functional block diagram of an example of a conventional network architecture.

FIG. 1 illustrates an example network architecture in which subscribers 10 are configured to communicate with a central office 12 over links 14. The central office aggregates signals from multiple subscribers and passes the signals onward toward the network 16. There are several technologies that may be used to connect subscribers with the central office, the most prevalent of which is the use of copper twisted pair wires, commonly referred to as subscriber loops. A given subscriber loop may have multiple segments. Other metallic links exist as well, such as metallic links formed using multiple twisted pair wires, and metallic links formed using coaxial cables used to provide cable television signals to cable television customers. Copper links in a communications network, such as subscriber loops and television cables, will be referred to herein as "metallic links." This defined term is to be understood to encompass links made of copper as well as other metallic materials should such materials be used to form communications networks. The term "metallic link" does not include materials such as optical fibers that are not electrically conductive.

There are many physical layer protocols which may be used to define how data is to be transmitted over a particular metallic link. For example, signals may be formatted according to one of the T1/E1/DS1 protocols, the T3/E3/DS3 protocols, or another of the T/E/DS protocols. Additionally, signals may be formatted using one of Digital Subscriber Line (DSL) protocols, such as Asymmetrical DSL (ADSL), High-bit-rate DSL (HDSL), Rate Adaptive DSL (RDSL), Symmetric DSL (SDSL), or Very high speed DSL (VDSL), although this list is not definitive as other DSL protocols may exist and may be developed in the future. These, and other DSL-based technologies, will be referred to herein collectively as xDSL. Other technologies, such as one of the Data Over Cable Service Interface Specification (DOCSIS) protocols, also adopted as a protocol known as ITU J.112, one of the EuroDOCSIS protocols, or the 802.14 protocol, may also be used to format signals for transmission over cable television metallic links. A given physical layer protocol (layer 1 protocol) instantiated on a given metallic link will be defined herein as a particular "physical medium."

A subscriber may have a single computer connected to the metallic link 14 or may have a group of computers connected, e.g., over a Local Area Network 18. A network element configured to interface between the subscriber's computer or LAN 18 the metallic link 14 will be referred to herein as Subscriber Premises Equipment (SPE). The computer or local area network may desire to communicate over the metallic link using one or more higher layer (layer 2 or layer 3) protocols, such as Asynchronous Transfer Mode (ATM), Frame Relay, Ethernet, Internet Protocol/Point-to-Point Protocol (IP/PPP), Voice, and Infiniband, depending on the configuration of the local area network and the purpose for the communication. Other layer 2 (link layer) and layer 3 (network layer) protocols exist and this list of protocols is not definitive. Layer 2 and layer 3 protocols will be collectively referred to herein as "services." Traffic from the subscriber LAN that is required to exit the LAN, as well as voice traffic, will traverse the SPE and be forwarded by the SPE to the central office over the metallic link.

The large number of physical mediums to be supported as well as the large number of services that can be provisioned over the physical mediums may cause problems for the central office. Specifically, the central office needs to provision specific ports on access devices to handle each of the physical mediums. Additionally, each of the ports must be provisioned to handle traffic formatted according to the particular service for that subscriber.

Figure 2:
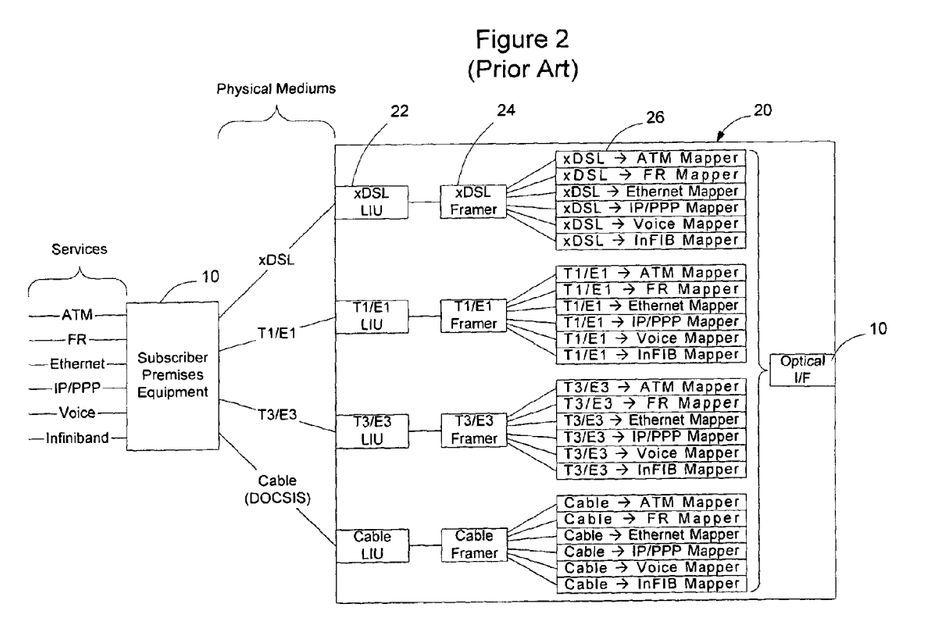
FIG. 2 is a functional block diagram of an example of a conventional network access device.

FIG. 2 illustrates one conventional network access device 20 that may be utilized at a central office to interface with various physical mediums. As shown in FIG. 2, a network access device will typically include one or more line interface units 22, each of which acts as a physical interface to a particular type of physical medium. For example, in the illustrated embodiment, there is a set of line interface units configured to interface with metallic links operating using one of the xDSL protocols, a set of line interface units configured to interface with metallic links operating using T1/E1 protocols, a set of line interface units configured to interface with metallic links operating using T3/E3 protocols, and a set of line interface units configured to interface with metallic links operating according to one of the cable television standards, such as DOCSIS. Each line interface unit is associated with a particular port which interconnects the network access device with the metallic link to the subscriber. A given network access device may be configured to interface with any number of physical mediums and may have hundreds or more ports.

Signals received through a line interface unit are conditioned and passed to a framer 24 which removes physical layer specific information from the signals and reassembles frames passed over the subscriber loop. Because the different physical mediums format data differently for transmission, a different framer is required for each type of physical medium supported by the network access device. Reassembled frames are passed to a service mapper 26 configured to reassemble protocol data units to restore the original protocol data units, e.g. packets, delivered by the LAN to the SPE, so that the protocol data units may be handled by the network element and forwarded onto the remainder of the network. Where the network access device is connected to an optical network, the protocol data units are then passed to an optical interface 28 for transmission from the network access device onto the higher communication bandwidth resources afforded by the network 16.

In a conventional network access device, such as the network access device illustrated in FIG. 2, one framer is required for each physical medium supported by the network element. Additionally, for each framer, a set of service specific mappers is required to enable the network access device to map protocol data units onto the particular physical medium. Thus, if a network access device was to support N types of physical layer protocols (e.g. xDSL, T1/E1, T3/E3, and Cable) and M types of services (e.g. ATM, Frame Relay, Ethernet, IP/PPP, Voice, and Infiniband) the network access device would need to implement NxM service mappers. In the embodiment illustrated in FIG. 2, for example, the network access device would need to implement 24 different service mappers. Accordingly, the number of service mappers becomes increasingly large as the number of types of physical mediums supported by a network access device increases and as the number of services supported by a given network element increases.

Additionally, provisioning ports on the network access device becomes increasingly more complex as the number of supported services increases. Specifically, in addition to requiring the network access device to keep track of which ports are to use which physical layer protocol, the network access device is also required to pay attention to the type of service provisioned over that port and to cause the appropriate service mapper to be associated with the port assigned to the particular subscriber. Where the subscriber changes its internal network configuration, for example to migrate from Frame Relay to Ethernet, the network provider is required to reconfigure the port assigned to the customer (possibly manually) to cause traffic from that port to be sent to the new service mapper.

Moreover, certain services cannot be transmitted over certain physical layer protocols. For example, the T1 physical layer protocol requires Point-to-Point Protocol (PPP) to be used as a link-layer protocol. Where the client desires to run Ethernet over a T1 subscriber loop, the SPE is required to terminate the Ethernet connection and reformat the data to be transmitted over the T1 subscriber loop using PPP. The reverse process occurs at the central office whereby the PPP frames are discarded and Ethernet frames are recreated. This creates additional overhead and prevents a true Ethernet network from being formed where the traffic must traverse a T1-provisioned link.

Accordingly, it would be advantageous to alter the characteristics of how communications between subscribers and the central office takes place to reduce the complexity of the network access device and simplify operation to reduce the amount of overhead associated with operating the network access device.

SUMMARY OF THE INVENTION

The present invention overcomes these and other drawbacks by providing an apparatus and method and apparatus for encapsulating services for transportation over metallic physical mediums. According to one embodiment of the invention, a universal mapper enables multiple services to be mapped onto a physical medium so that the number of service mappers, and hence the complexity of the network access device, may be reduced. Additionally, utilizing a universal mapper to map services onto different physical mediums enables the network element to be agnostic with respect to the type of service being handled over a given port. This reduces the amount of provisioning required on the network access device to thereby reduce overhead expenses associated with operating the network access device. Moreover, a given port may be configured to handle more than one service, so that subscribers may communicate using more than one protocol. Finally, the use of a universal mapping technology enables services to be passed over copper physical links that otherwise may not be passed over the links. For example, the user of a universal mapping technology enables Ethernet to be transported over T1 links.

In a preferred embodiment, the universal mapper is configured to generate frames for transmission over multiple physical mediums utilizing a protocol known as Generic Framing Procedure (GFP). GFP provides a generic mechanism to adapt traffic from higher-layer client signals (such as Layer 3 and Layer 2 signals) over an octet synchronous transport network. While GFP is presently preferred for use as the universal mapping technology, and the invention will be discussed in connection with explaining how GFP may be used to transport signals over various physical mediums, the invention is not limited to this embodiment but rather extends to any universal mapping technology on metallic links.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enables multiple services to be encapsulated for transportation over metallic physical mediums. According to one embodiment of the invention, a universal mapper enables multiple services to be mapped onto a physical medium so that the number of service mappers, and hence the complexity of the network access device, may be reduced. Additionally, utilizing a universal mapper to map services onto different physical mediums enables the network element to be agnostic with respect to the type of service being handled over a given port. This reduces the amount of provisioning required on the network access device to thereby reduce overhead expenses associated with operating the network access device. Moreover, a given port may be configured to handle more than one service, so that subscribers may communicate using more than one protocol. Finally, the use of a universal mapping technology enables services to be passed over copper physical links that otherwise may not be passed over the links. For example, the user of a universal mapping technology enables Ethernet to be transported over T1 links.

According to one embodiment of the invention, Generic Framing Procedure (GFP) is utilized to encapsulate protocol data units for transmission over multiple physical mediums. GFP provides a generic mechanism to adapt traffic from higher-layer client signals (such as Layer 3 and Layer 2 signals) over an octet synchronous transport network. While GFP is presently preferred for use as the universal mapping technology, and the invention will be discussed in connection with explaining how GFP may be used to transport signals over various physical mediums, the invention is not limited to this embodiment but rather extends to any universal mapping technology on metallic links. GFP is discussed in greater detail below in connection with FIG. 6.

Figure 3:
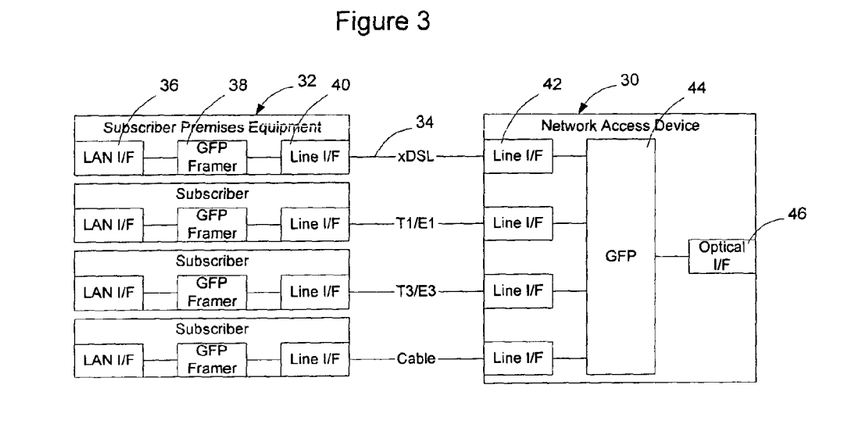
FIG. 3 is a functional block diagram of an example of a network architecture according to an embodiment of the invention.

FIG. 3 illustrates one embodiment of the invention in which a network access device 30 disposed, for example, in a central office, is configured to interface with subscriber premises equipment 32 over metallic links 34 operating according to a physical layer protocol. As shown in FIG. 3, packets formed according to the service instantiated on the LAN arrive at a LAN interface 36 on the subscriber premises equipment 34 and are passed to a GFP framer 38. The GFP framer generates a GFP frame containing one or more of the LAN service packets and forwards the GFP frame to a line interface 40. The line interface 40 transmits the GFP frames carrying the LAN service packets to the network access device 30 where they are received at a line interface 42. The line interface 42 reassembles the GFP frames (physical layer protocols generally require transmission of frames bit-by-bit in a serial fashion) and passes the GFP frames to the GFP module 44. The GFP module removes the GFP frames, if necessary, to restore the protocol data units for transmission over the optical interface 46. Where the optical interface is operating using the SONET physical layer protocol, and the service packets are to be transported over the SONET interface using GFP, the GFP module may simply pass the GFP frames to the optical interface 46 for transmission.

Figure 4:
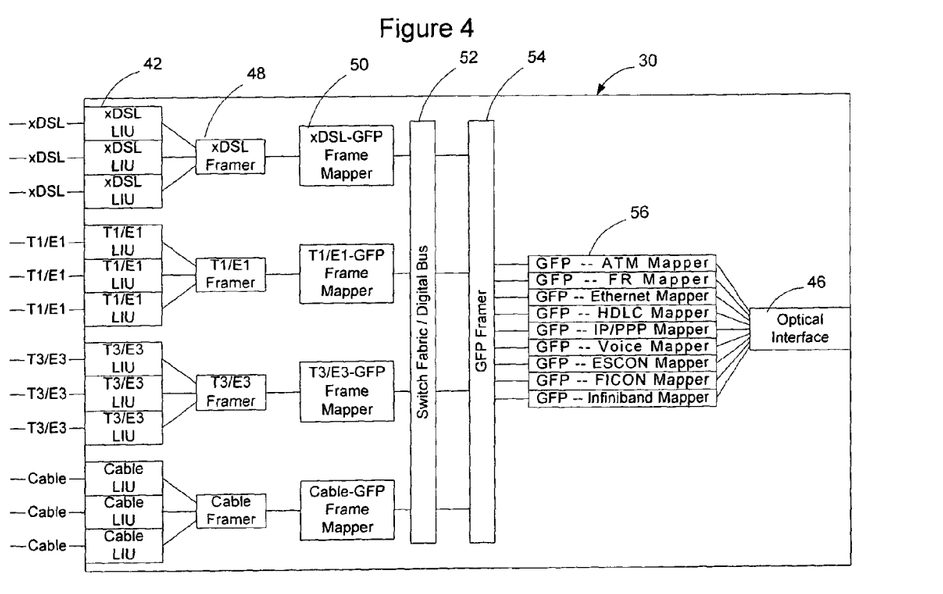
FIG. 4 is a functional block diagram of a network access device according to an embodiment of the invention.
Figure 5:
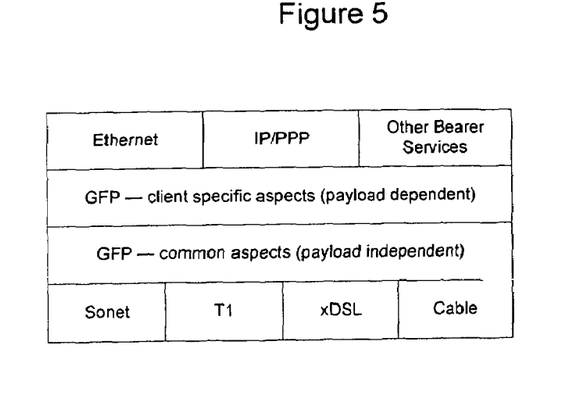
FIG. 5 is a functional block diagram illustrating the interrelationship between protocols in use on the network of FIG. 3.

FIG. 4 illustrates the network access device 30 of FIG. 3 in greater detail. As shown in FIG. 4, the network access device according to one embodiment of the invention includes four types of line interface units 36 configured to interface with metallic links. Specifically, in the illustrated embodiment, a line interface units 36 have been configured to interface with metallic links on which xDSL, T1/E1, T3/E3, and cable (e.g. DOCSIS) physical layer protocols have been configured to operate. The invention is not limited to a network access device configured to interface with all or only these selected physical mediums, but rather extends to a network access device configured to interface with a metallic link utilizing any physical layer protocol.

There may be many ports configured to interface with each type of physical medium, as illustrated in FIG. 4. Each port has a line interface configured to interface with the physical medium. The line interfaces are generally responsible for formatting signals for transmission over the physical medium, such as by ensuring the signals are output according to the proper bit rate, sequence, etc., and for receiving signals on the physical medium. Many different aspects of the signals on the metallic links are specified in the various protocols that define the transmission characteristics of the physical mediums.

Signals received by the line interface units 42 are passed to a framer 48 specific to the particular physical medium where physical medium frames are reconstructed. These frames are forwarded to a GFP frame mapper 50 which removes physical layer frame constructs, e.g., headers, and reassembles GFP frames. The GFP frames are passed through a switch fabric 52 to the GFP framer 54 where the protocol data units are extracted from the GFP frames. The protocol data units are then forwarded to an appropriate service mapper which maps the service packets onto the optical interface for transmission.

In the reverse direction, packets arriving at the optical interface are passed to the appropriate service mapper where they are mapped to GFP frames. The GFP frames encapsulating the protocol data units are created by the GFP framer and are routed through the switch fabric to an appropriate destination port. The GFP frames are mapped to xDSL, or other appropriate physical medium by the GFP frame mapper and xDSL framer, and then output over the port by the appropriate line interface unit.

Figure 6:
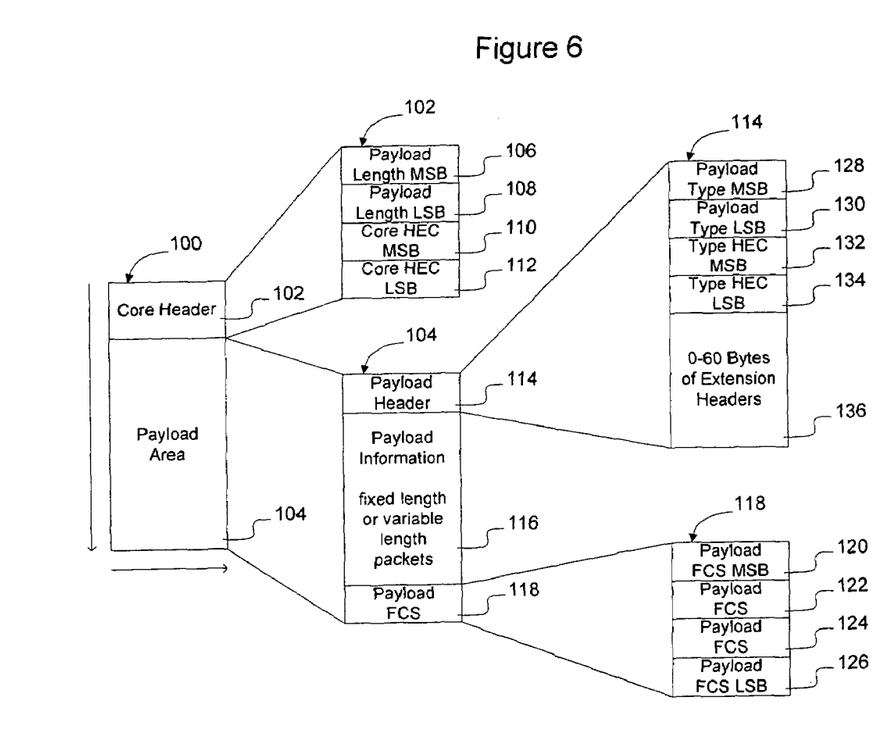
FIG. 6 is a functional block diagram of a Generic Framing Procedure Frame.

FIG. 6 illustrates where Generic Framing Procedure fits in the multi-level network protocol hierarchy. On the bottom layer, layer 1, are the physical layer protocols such as SONET (an optical physical layer protocol), T1, xDSL, and cable. Above that lies the aspects of GFP which are payload independent. These aspects, as discussed in greater detail below, are generally the format of the GFP frames, including the format of the core header and the shape/size of the payload area of the GFP frame.

Within the GFP frame payload area, there are certain aspects of GFP that may be customized to accommodate specific client (service specific) requirements. For example, as discussed in greater detail below, the payload may include a payload header that specifies particular information about the payload.

Above the client specific aspects of GFP lie the services themselves. Protocol data units formed by one or more of the services are encapsulated by GFP for transportation over one of the physical mediums. The protocol data units may be formed using layer 2 (ATM, Ethernet), layer 3 (Internet Protocol), combination layer 2/layer 3 (IP/PPP) or higher layer services. The invention is not limited to any particular service, group of services, or class of services to be transported by GFP over physical mediums.

FIG. 6 illustrates the GFP frames in greater detail. As discussed above, the invention is not limited to using GFP but may instead be adapted to utilizing another encapsulation protocol. As shown in FIG. 6, a GFP frame 100 includes a core header 102 and a payload area 104. The core header is used to define the length of the payload area and to perform error checking to ensure the frame is transmitted in tact. The GFP frame is transmitted over the physical layer protocol bit wise from left to right, and byte wise from top to bottom starting with the first octet of the core header and ending with the last octet of the payload area.

The core header in GFP generally includes two payload length octets 106, 108, enabling the length of the payload area to be any length between 4 and 65535 octets. The core header also includes two core header CRC (cyclic redundancy check) octets 110, 112 which are used by the receiving device to ensure it has received the frame uncorrupted.

The payload area 104 includes a payload header 114, which is generally used to specify the type of payload carried by the frame and various extensions to GFP not particularly important to the embodiments of this invention. The payload area 104 also includes the payload information 116, which generally is made up of fixed length or variable length protocol data units, and optionally a payload FCS (Frame cyclic redundancy check octets) 118. In the current GFP implementation, the payload FCS is four octets 120-126.

The payload header 114 includes two octets 128, 130 containing the payload type most significant bit and the payload type least significant bit. These two octets specify the type of service to be carried by the GFP frame in the payload area. According to embodiments of the invention, the GFP frame mapper uses these octets to ascertain the type of protocol being carried by the GFP frame and invoke the appropriate GFP-service mapper to extract service packets from the GFP frame.

The payload may also include additional header CRC octets 132, 134, and 0 to 60 bytes of extension headers 136. The Extension headers are generally used to support client multiplexing and other client specific information. Future extensions may be useful to implementation of the described embodiments, for example, by allowing GFP frames to be multiplexed and mapped into larger GFP frames for transmission over higher bandwidth network resources. Additional information associated with the format of GFP frames, its constituent parts, and the extensions currently available may be found in the latest T1/X1 and ITU working documentation and discussions.

There are currently two types of GFP: frame-mapped GFP (GFP-F) and transparent GFP (GFP-T). In frame-mapped GFP, a single client frame (e.g., an IP packet or Ethernet MAC frame) is mapped into a single GFP frame. In transparent GFP, a fixed number of client characters are mapped into a GFP frame of predetermined length.

Figure 7:
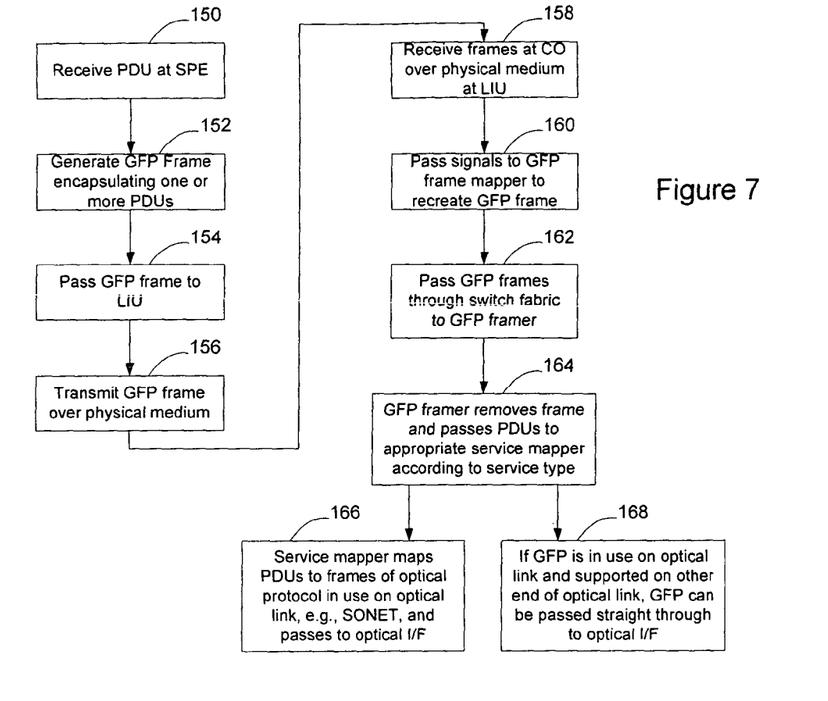
FIG. 7 is a flowchart of an example of how a packet is handled when transmitted from a subscriber premises equipment to a network access device such as the network access device of FIG. 4 according to an embodiment of the invention.

FIG. 7 illustrates a flow diagram of operations that may be performed on a protocol data unit formed according to a particular service as it traverses through the subscriber premises equipment over the physical medium, and through the network access device. As shown in FIG. 7, when a PDU is received at the subscriber premises equipment (150), the SPE generates a GFP frame encapsulating the protocol data unit (152) or adds the protocol data unit to a GFP frame containing other protocol data units. This may be performed, for example, by the GFP framer illustrated in the SPE of FIG. 3. The GFP frames are then passed to the metallic link interface unit (154) and transmitted over the metallic link connecting the SPE with the CO in conformance using whatever physical protocol is instantiated on the physical medium (156).

When the central office receives signals on the physical medium (158) it passes the signals to the GFP frame mapper to enable the GFP frame mapper to recreate the GFP frame from the received signals (160). The GFP frame mapper may perform whatever error checking, etc., that is required to ensure the GFP frame mapper has received a complete GFP frame.

When a complete GFP frame has been received, the GFP frame is passed through the switch fabric (162) to the GFP framer which removes the GFP specific portions of the frame to recover the service PDUs from the GFP frame payload (164). The PDUs are passed to the appropriate service mapper according to service type which is ascertained by the GFP framer according to the Payload header 114 as discussed above in connection with FIG. 6.

The service mapper maps the PDUs to frames used on the optical transport network (166). For example, if SONET is used on the optical link as the physical layer transport protocol, the GFP-service mappers map the service PDUs to appropriate SONET constructs to enable the PDUs to be transported over the SONET link onto the remainder of the network. Where GFP is to be used on the SONET network as well (GFP was created for SONET) the GFP frames can be passed directly from the GFP framer to the optical framer without extracting the service PDUs to be extracted and remapped (168). Optionally, multiple GFP frames can be multiplexed together to form a larger size GFP frame before being sent to the optical framer.

Figure 8:
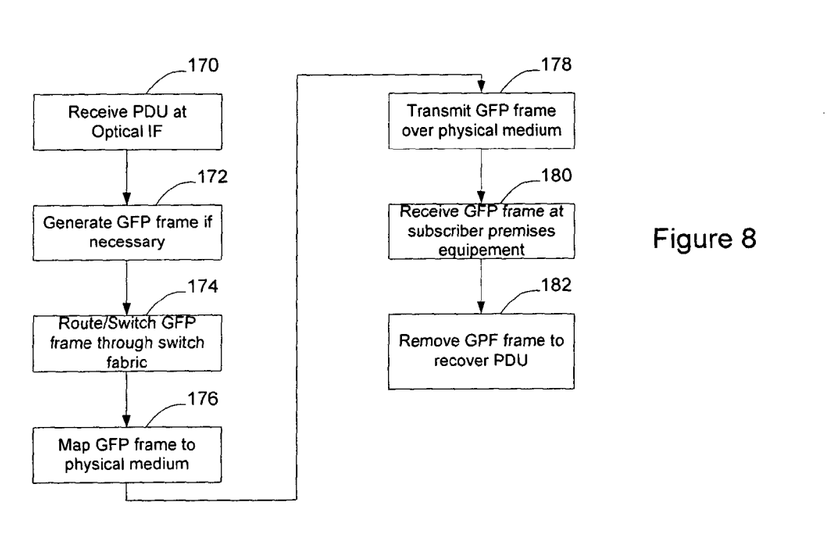
FIG. 8 is a flowchart of an example of how a packet is handled when transmitted from a network access device such as the network access device of FIG. 4 to a subscriber premises equipment according to an embodiment of the invention.

The reverse process, for packets arriving over the optical data link, is the same as the forward process except that the operations are reversed. Specifically, as shown in FIG. 8, when a PDU is received at the optical interface (170), the network access device ascertains the destination port associated with the PDU and the service protocol used to create the PDU. The PDU is then transmitted to the appropriate GFP-service mapper to enable the PDU to be encapsulated in a GFP frame (172). The PDU may be encapsulated by itself or may be encapsulated along with other PDUs intended for the same port. Where GFP is supported on the optical link a GFP frame received over the optical link may be passed directly to the GFP framer.

The GFP framer creates the GFP frame using information received from the GFP-service mapper and passes the GFP frame to the switch fabric. The switch fabric routes/switches the packet within the network access device to the appropriate port (174) where it is output to a GFP frame mapper for that port. The GFP frame mapper passes the GFP frame to a framer specific to the physical medium (176) used to transport over the link interconnecting the port with the destination SPE. The framer outputs signals to the appropriate line interface unit which outputs the signals on the metallic link interconnecting the network access device with the subscriber premises equipment to transmit the GFP frame over the physical medium (178).

Signals received at the subscriber premises equipment are received at the line interface unit (180), passed to the GFP framer for reconstruction, and the protocol data units are recovered from the payload portion 114 of the GFP frame (182). The PDUs are then output onto the local area network.

The components of the network access device may be formed from Application Specific Integrated Circuits (ASICS) or one or more components may be formed using a microprocessor containing control logic implemented as a set of program instructions that are stored in a computer readable memory 44. For example, the GFP framer may be formed from a re-programmable network processor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. For example, while the invention has been described in connection with transmission of signals to/from a central office, the invention is not limited to this embodiment but rather extends to transmission of signals over any metallic link. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network device, comprising:
a first plurality of line interface units interfaced with a first plurality of subscriber premises equipment over a first type of physical medium, said first type of physical medium comprising a combination of a first type of metallic link and a first physical layer protocol, said first plurality of line interface units outputting first signals received via the first type of physical medium;
a first framer associated with the first plurality of line interface units and specific to the first type of physical medium, said first framer receiving the first signals output from the first plurality of line interface units and reconstructing first frames formatted according to the first physical layer protocol;
a first universal frame mapper associated with the first framer, said first universal frame mapper receiving the first frames formatted according to the first physical layer protocol and reassembling first universal frames for processing by the network device;
a second plurality of line interface units interfaced with a second plurality of subscriber premises equipment over a second type of physical medium, said second type of physical medium comprising a combination of a second type of metallic link and a second physical layer protocol, said second plurality of line interface units outputting second signals received via the second type of physical medium;
a second framer associated with the second plurality of line interface units and specific to the second type of physical medium, said second framer receiving the second signals output from the second plurality of line interface units and reconstructing second frames formatted according to the second physical layer protocol; and
a second universal frame mapper associated with the second framer, said second universal frame mapper receiving the second frames formatted according to the second physical layer protocol and assembling second universal frames for processing in common with the first universal frames by the network device;
an optical line interface unit interfaced with an optical transmission medium; and
switching circuitry interconnected between the optical line interface unit and the first and second universal frame mappers to switch Generic Framing Procedure (GFP) frames between the optical line interface unit and the first and second universal frame mappers.

2. The network device of claim 1, wherein the first universal frames are Generic Framing Procedure (GFP) frames.

3. The network device of claim 1, wherein both the first universal frames and the second universal frames are Generic Framing Procedure (GFP) frames.

4. The network device of claim 3, further comprising a switch fabric to switch the GFP frames.

5. The network device of claim 1, further comprising a third universal framer that receives the first and second universal frames and extracts protocol data units from the first and second universal frames.

6. The network device of claim 5, wherein both the first universal frames and the second universal frames are Generic Framing Procedure (GFP) frames, and wherein the protocol data units are service level protocol data units.

7. The network device of claim 6, further comprising a plurality of service mappers, one service mapper for each type of service level protocol data unit to be handled by the network device, and wherein the service mappers map the service level protocol data units to an optical physical medium for transmission over an optical physical layer protocol via an optical line interface unit.

8. The network device of claim 1, wherein the first universal frame mapper receives the first frames formatted from the metallic link according to the first physical layer protocol and reassembles first Generic Framing Procedure (GFP) frames for processing by the network device, thus enabling GFP to be used to transmit data across the metallic link between the subsciber premises equipment and the network device.

9. The network device of claim 8, wherein the GFP frames comprise a core header and a payload, said payload being configured to contain at least one of said protocol data units.

10. The network device of claim 9, wherein the core header is configured to contain an indication of the length of the payload, wherein the payload is configured to contain a payload header, and wherein the payload header is configured to contain an indication of the type of protocol data unit contained in the payload.

11. A network device, comprising:
a first plurality of line interface units interfaced with first metallic links of a first type over which data is formatted for transmission using a first physical layer protocol;
a first physical framer associated with the first line interface units to receive first signals from the first plurality of line interface units and create, from the first signals, first physical frames;
a first GFP frame mapper associated with the first physical framer to receive the first physical frames and reassemble GFP frames therefrom without regard to a service associated with the physical frames;
a second plurality of line interface units interfaced with second metallic links of a second type over which data is formatted for transmission using a second physical layer protocol;
a second physical framer associated with the second line interface units to receive second signals from the second plurality of line interface units and create, from the second signals, second physical frames;
a second GFP frame mapper associated with the second physical framer to receive the second physical frames and reassemble GFP frames therefrom without regard to a service associated with the physical frames;
an optical line interface unit interfaced with an optical transmission medium; and
switching circuitry interconnected between the optical line interface unit and the first and second GFP frame mappers to switch Generic Framing Procedure (GFP) frames between the optical line interface unit and the first and second GFP frame rappers.

12. The network device of claim 11, further comprising a switch fabric configured switch the GFP frames within the network device.

13. The network device of claim 12, further comprising a set of GFP-service specific mappers to extract service protocol data units from the OFP frames.

* * * * *

UNITED STATES PATENT AND TRADEMARK OFFICE
CERTIFICATE OF CORRECTION

| | | |
|---|---|---|
| PATENT NO. | : 7,385,998 B2 | Page 1 of 1 |
| APPLICATION NO. | : 10/657654 | |
| DATED | : June 10, 2008 | |
| INVENTOR(S) | : Wang | |

It is certified that error appears in the above-identified patent and that said Letters Patent is hereby corrected as shown below:

Column 10, line 16 "subsciber" should be --subscriber--.
Column 10, line 57 "rappers" should be --mappers--.
Column 10, line 63 "OFP" should be --GFP--.

Signed and Sealed this

Thirty-first Day of March, 2009

JOHN DOLL
*Acting Director of the United States Patent and Trademark Office*